(12) United States Patent
Shirai et al.

(10) Patent No.: US 10,831,075 B2
(45) Date of Patent: Nov. 10, 2020

(54) LIQUID CRYSTAL DISPLAY DEVICE

(71) Applicant: Panasonic Liquid Crystal Display Co., Ltd., Hyogo (JP)

(72) Inventors: Norimichi Shirai, Hyogo (JP); Ryutaro Oke, Hyogo (JP); Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/172,861

(22) Filed: Oct. 29, 2018

(65) Prior Publication Data

US 2020/0133085 A1 Apr. 30, 2020

(51) Int. Cl.
*G02F 1/1362* (2006.01)
*G09G 3/36* (2006.01)

(52) U.S. Cl.
CPC ..... *G02F 1/136286* (2013.01); *G09G 3/3688* (2013.01); *G09G 2300/0426* (2013.01)

(58) Field of Classification Search
CPC ............ G02F 1/136286; G09G 3/3688; G09G 2300/0426
See application file for complete search history.

(56) References Cited

U.S. PATENT DOCUMENTS

| | | | |
|---|---|---|---|
| 2008/0225216 A1 | 9/2008 | Shimodaira | |
| 2014/0152938 A1 | 6/2014 | Lee et al. | |
| 2014/0168552 A1* | 6/2014 | Jo | G02F 1/134363 349/33 |
| 2016/0351107 A1* | 12/2016 | Chen | G09G 3/20 |
| 2017/0162637 A1* | 6/2017 | Choi | G09G 3/3225 |

* cited by examiner

*Primary Examiner* — Mark W Regn
(74) *Attorney, Agent, or Firm* — HEA Law PLLC

(57) ABSTRACT

A display device is provided. The display device comprises a plurality of data lines extending in a first direction. The display device also comprises a plurality of gate lines. The plurality of gate lines comprises a first gate line, a second gate line and a third gate line extending in a second direction different than the first direction to form a matrix with the plurality of data lines. The first gate line and the second gate line are separated from each other and are arranged in a same row of the matrix. The display device further comprises a first gate connector line and a second gate connector line, respectively, electrically connecting the first gate line and the second gate line to one or two gate drivers. The first gate connector line and the second gate connector line extend in the first direction.

13 Claims, 6 Drawing Sheets

LIQUID CRYSTAL DISPLAY DEVICE

FIELD OF THE PRESENT DISCLOSURE

The present disclosure relates to a liquid crystal display device, and more particularly to a liquid crystal display device with a void in a display region thereof.

BACKGROUND

A liquid crystal display device is constituted to have a display panel with a pair of glass substrates that are arranged to face each other in an opposed manner with a liquid crystal layer being sandwiched therebetween. The display panel has a display region in which a plurality of gate lines extend in a first direction (usually horizontal scanning direction) and are arranged parallel to each other, and a plurality of data lines extend in a second direction (usually vertical scanning direction) and are arranged parallel to each other, such that the plurality of data lines crosses the plurality of gate lines and define pixels therebetween. The display panel further includes pixel electrodes and common electrodes which are formed in each of the pixels on one of the sides of the liquid crystal layer with respect to the said glass substrates. Each of the pixel electrodes is driven by a corresponding thin film transistor (TFT) disposed in the vicinity of the pixel electrode at respective crossing portions of the gate lines and the data lines. Typically, such gate lines and data lines are required to be continuous lines in order to conduct corresponding signal therein to respective TFTs.

Some manufacturers are trying to implement the liquid crystal display devices with voids formed in the display region thereof. For example, the liquid crystal display devices are being implemented in watches, such as smart watches, for displaying relevant information in addition to time. In such implementation of a liquid crystal display device, it may become necessary to form a hole or the like in order to attach one or more indicators, such as various hands like a second-hand, a minute-hand and an hour-hand, which are used to indicate time in a watch. Such void, created due to the formed hole, may obstruct path of the gate lines and the data lines in the display region.

US Patent Publication Number 20080225216A1 proposes a solution to overcome the problem of forming the gate lines and the data lines in the display region with a void. The publication discloses an active matrix circuit substrate which includes: a substrate having an avoidance portion provided in a predetermined region; a plurality of pixel electrodes provided on the substrate; a driving circuit that is provided on the substrate and drives the a plurality of pixel electrodes; a plurality of wiring lines which are provided on the substrate and include a plurality of power lines electrically connected to the driving circuit and a part of which has a detour portion that makes a detour to avoid the avoidance portion; and a connecting portion which is provided in the periphery of the avoidance portion on the substrate and which is connected to the power lines such that the plurality of power lines are packed.

The proposed solution requires detouring of the gate lines and the data lines in the display region around any hole or the like that may be formed therein. Generally, in a liquid crystal display device, the gate lines are wider than the data lines in order to carry the required signals therein. Thus, it may be feasible to detour the data lines; however, detouring of the gate lines may be difficult and expensive to achieve without deteriorating the quality of image produced by the liquid crystal display device.

Furthermore, the display panel also has a non-display region on an outer side of the display region. On the glass substrates of the display panel, gate drivers and data drivers are arranged in the non-display region for applying signals to the gate lines and the data lines to drive the TFTs associated therewith. In such arrangement of the drivers, the non-display region is necessary at a peripheral edge portion of the display panel. It is to be noted that in the liquid crystal display device, the non-display region of the display panel is covered with a front frame (bezel) or the like. Conventionally, an effort has been made to reduce the size of the non-display region in order to thin the bezel.

The present invention has been made in view of such considerations, and it is an object of the present invention to provide a liquid crystal display device which can be implemented for applications requiring a void or the like to be formed in the display region thereof while also reducing the size of the non-display region therein.

SUMMARY

In an aspect, a display device is disclosed. The display device comprises a plurality of data lines extending in a first direction. The display device also comprises a plurality of gate lines. The plurality of gate lines comprises a first gate line, a second gate line and a third gate line extending in a second direction different than the first direction to form a matrix with the plurality of data lines. The first gate line and the second gate line are separated from each other and are arranged in a same row of the matrix. The display device further comprises a first gate connector line and a second gate connector line, respectively, electrically connecting the first gate line and the second gate line to one or two gate drivers. The first gate connector line and the second gate connector line extend in the first direction.

In one or more embodiments, the plurality of data lines extends in a display region of the display device. The plurality of data lead lines electrically connects the plurality of data lines to one or more data drivers arranged in a non-display region of the display device.

In one or more embodiments, the plurality of gate lines and each of the first gate connector line and the second gate connector line extend in the display region. Each of the first gate connector line and the second gate connector line are electrically connected to the one or two gate drivers, arranged in the non-display region, via one or more first gate lead lines.

In one or more embodiments, the display device further comprises a third gate connector line extending in the first direction and electrically connecting the third gate line to the one or more gate drivers, arranged in the non-display region, via one or more second gate lead lines.

In one or more embodiments, each of the one or more first gate lead lines branches into a first gate lead branch line and a second gate lead branch line. The first gate lead branch line is connected to the first gate connector line and the second gate lead branch line is connected to the second gate connector line.

In one or more embodiments, the first gate lead branch line comprises a first portion and a second portion. The first portion overlaps, at least partially, the one or more second gate lead lines in plan view.

In one or more embodiments, the first portion is arranged in a same layer as the plurality of data lines.

In one or more embodiments, the second portion is arranged in a same layer as the plurality of gate lines.

In one or more embodiments, the second gate lead branch line is arranged in a same layer as the plurality of gate lines.

In one or more embodiments, the first gate line and the second gate line are separated at a void in a display region of the display device.

In one or more embodiments, the third gate line is longer than a combination of the first gate line and the second gate line.

In one or more embodiments, the first direction and the second direction are orthogonal to each other.

In one or more embodiments, the one or two gate drivers comprise a first gate driver and a second gate driver. The first gate connector line connects the first gate line to the first gate driver and the second gate connector line connects the second gate line to the second gate driver.

In one or more embodiments, the one or two gate drivers comprise a single gate driver configured to send pulses to the first gate line and the second gate line simultaneously.

In one or more embodiments, each of the first gate line and the second gate line comprises at least one contact point formed therein. The first gate connector line and the second gate connector line are, respectively, connected to the first gate line and the second gate line at the corresponding at least one contact point.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

A display device of each exemplary embodiment described below includes a display panel that display images, a driving circuit with one or more data drivers and one or more gate drivers that drive the display panel, a timing controller that control the driving circuit, an image processor that performs image processing on an input video signal input and outputs image data to the timing controller, and a backlight that irradiates the display panel with light from a rear surface side thereof. The display device is further provided with a void formed in the display panel. Examples of the display device include, but not limited to, a liquid crystal display (LCD), a plasma display panel (PDP), an organic light emitting diode (OLED) display, and an electrophoresis display (EPD).

Figure 1:
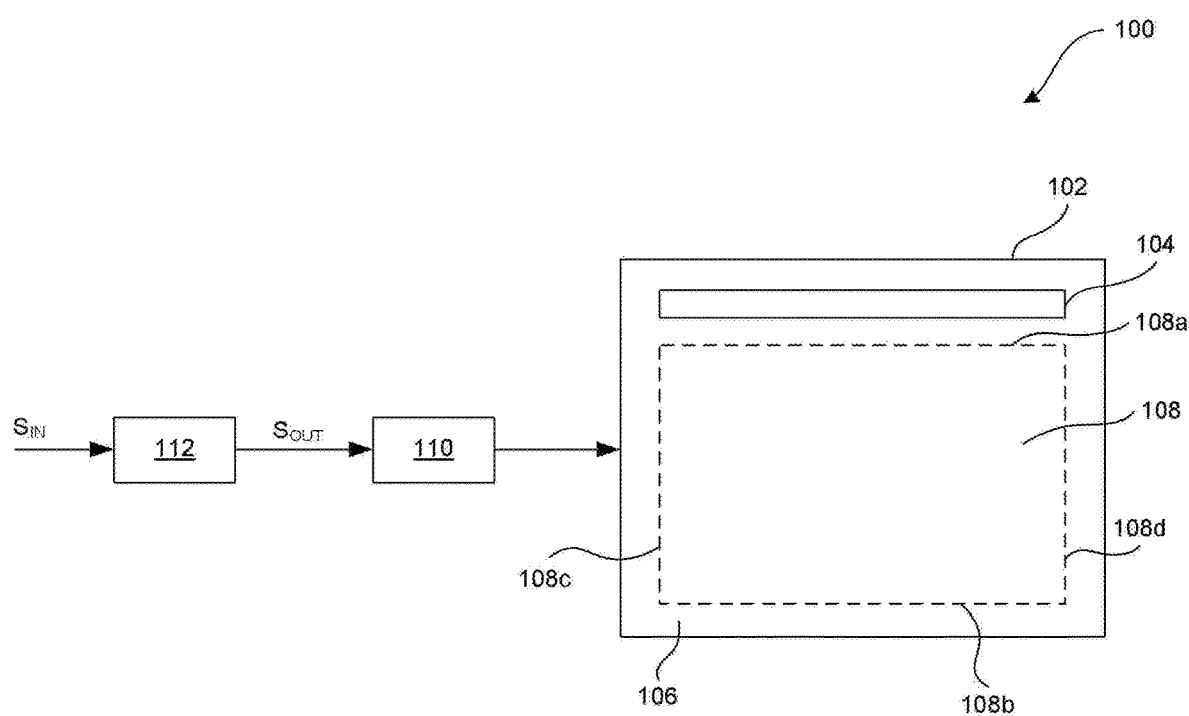
FIG. 1 is a schematic representation of a display device, in accordance with one or more embodiments of the present disclosure.

FIG. 1 illustrates a schematic configuration of a display device (generally referenced by the numeral 100), in accordance with one or more embodiments of the present disclosure. As illustrated in FIG. 1, the display device 100 includes a display panel 102. The display panel 102 includes a driving circuit 104 disposed in a non-display region 106, bordering a display region 108, in the display panel 102. The driving circuit 104 may be arranged proximal to any one of an upper edge 108a, a lower edge 108b, a left edge 108c and a right edge 108d, of the display region 108 in the display panel 102. In the present embodiments, the driving circuit 104 is shown to be arranged proximal to the upper edge 108a of the display region 108. In addition, the display device 100 includes a timing controller 110 that controls the driving circuit 104, and an image processor 112 that outputs image data to the timing controller 110. The image processor 112 receives input video signals data $S_{IN}$ transmitted from an external system (not illustrated), performs known image processing on the input video signal data $S_{IN}$, and outputs image signal data $S_{OUT}$ to the timing controller 110. The image processor 112 may also output a control signal (not shown in FIG. 1), such as a synchronizing signal, to the timing controller 110. In the display device 100, the display panel 102 displays an image in the display region 108 thereof according to the image signal data $S_{OUT}$.

FIGS. 2, 6, 8 and 9 illustrate plan views of the display panel 102 according to various exemplary embodiments of the present disclosure. As illustrated, the display panel 102 includes a plurality of data lines (generally referenced by the numeral 114) and a plurality of gate lines (generally referenced by the numeral 116) formed in the display region 108. The plurality of data lines 114 and the plurality of gate lines 116 may be formed of Aluminum (Al) or Copper (Cu); however, it may be contemplated that other metals with high melting point, such as Chromium (Cr), Molybdenum (Mo), Tungsten (W), Titanium (Ti), Tantalum (Ta) or an alloy of two or more kinds of these metals, or a lamination film of two or more kinds of these metals or alloys, may be used without any limitations. As shown, the plurality of data lines 114 generally extend in a first direction (referenced as 'X' axis) and the plurality of gate lines 116 generally extend in a second direction (referenced as 'Y' axis). Further, as shown, the plurality of data lines 114 are disposed parallel to each other in the second direction 'Y' by a same interval, and the plurality of gate lines 116 are disposed parallel to each other in the first direction 'X' by a same interval. As may be seen, the first direction 'X' and the second direction 'Y' are different from each other, or specifically orthogonal to each other, with the first direction 'X' generally extends along vertical scanning direction and the second direction 'Y' generally extends along horizontal scanning direction. Thereby, the plurality of data lines 114 and the plurality of gate lines 116 form a matrix in the display region 108 of the display panel 102.

Figure 6:
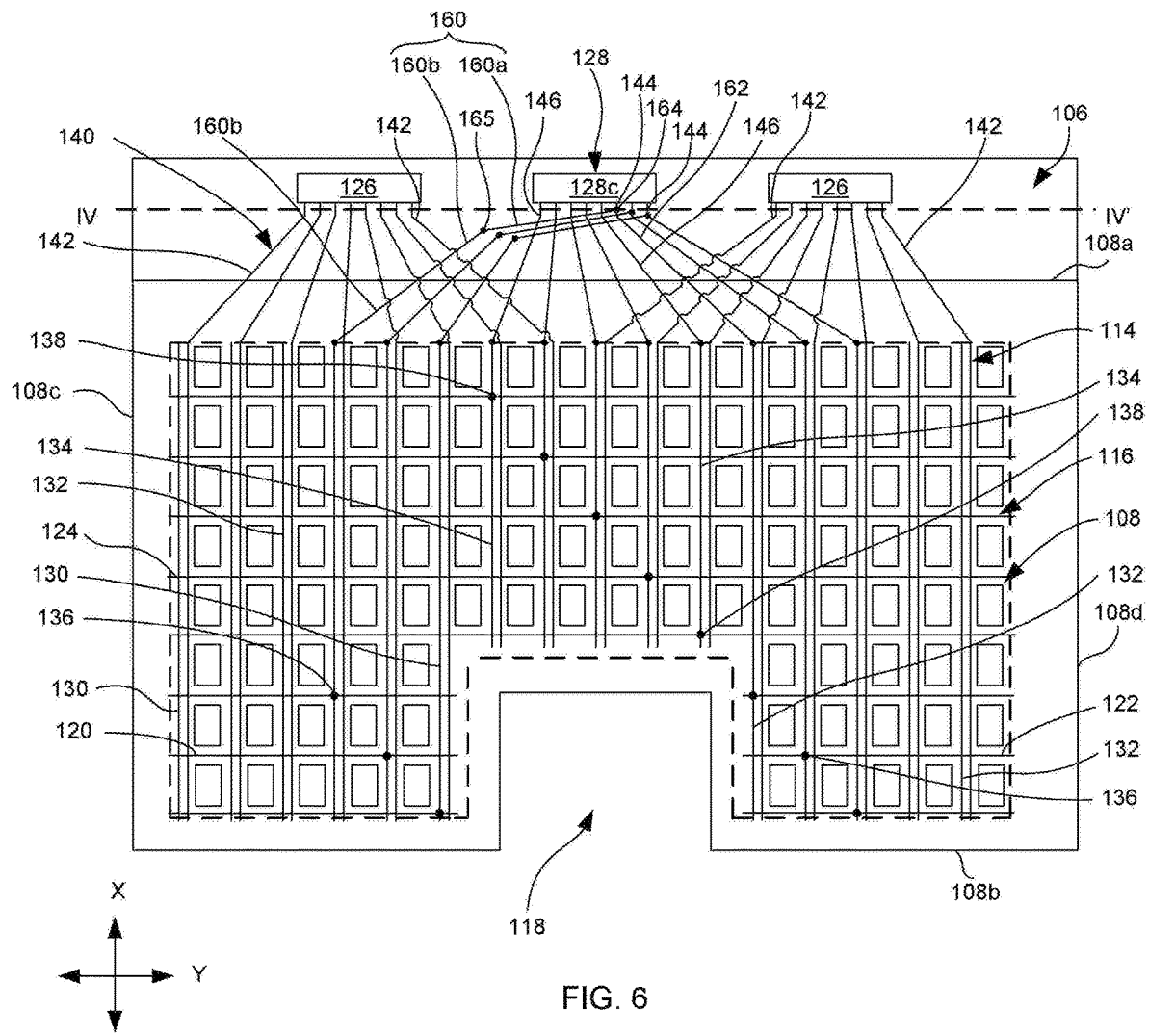
FIG. 6 is a plan view of a display panel of the display device, in accordance with another exemplary embodiment of the present disclosure.
Figure 8:
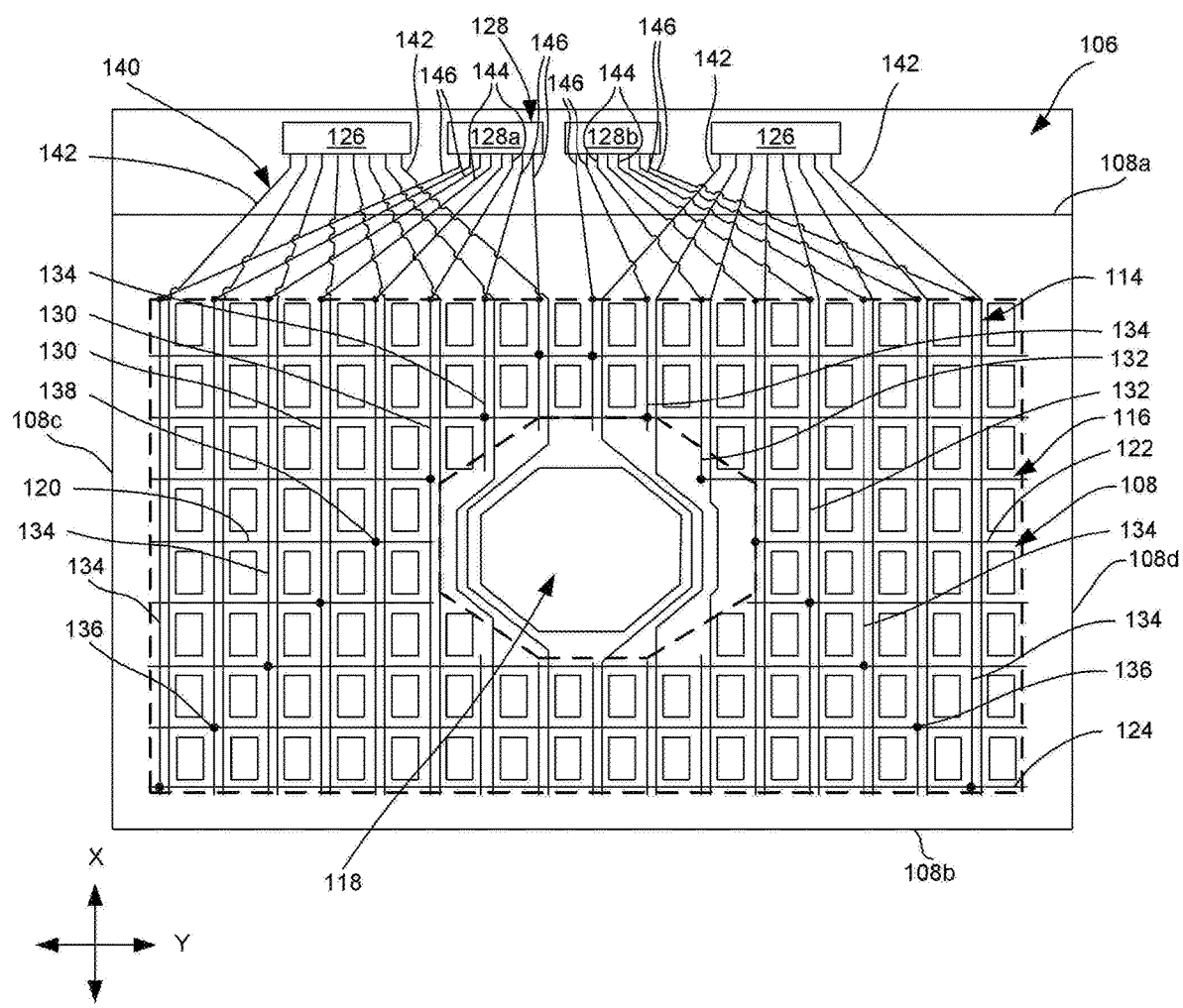
FIG. 8 is a plan view of a display panel of the display device, in accordance with another exemplary embodiment of the present disclosure.
Figure 9:
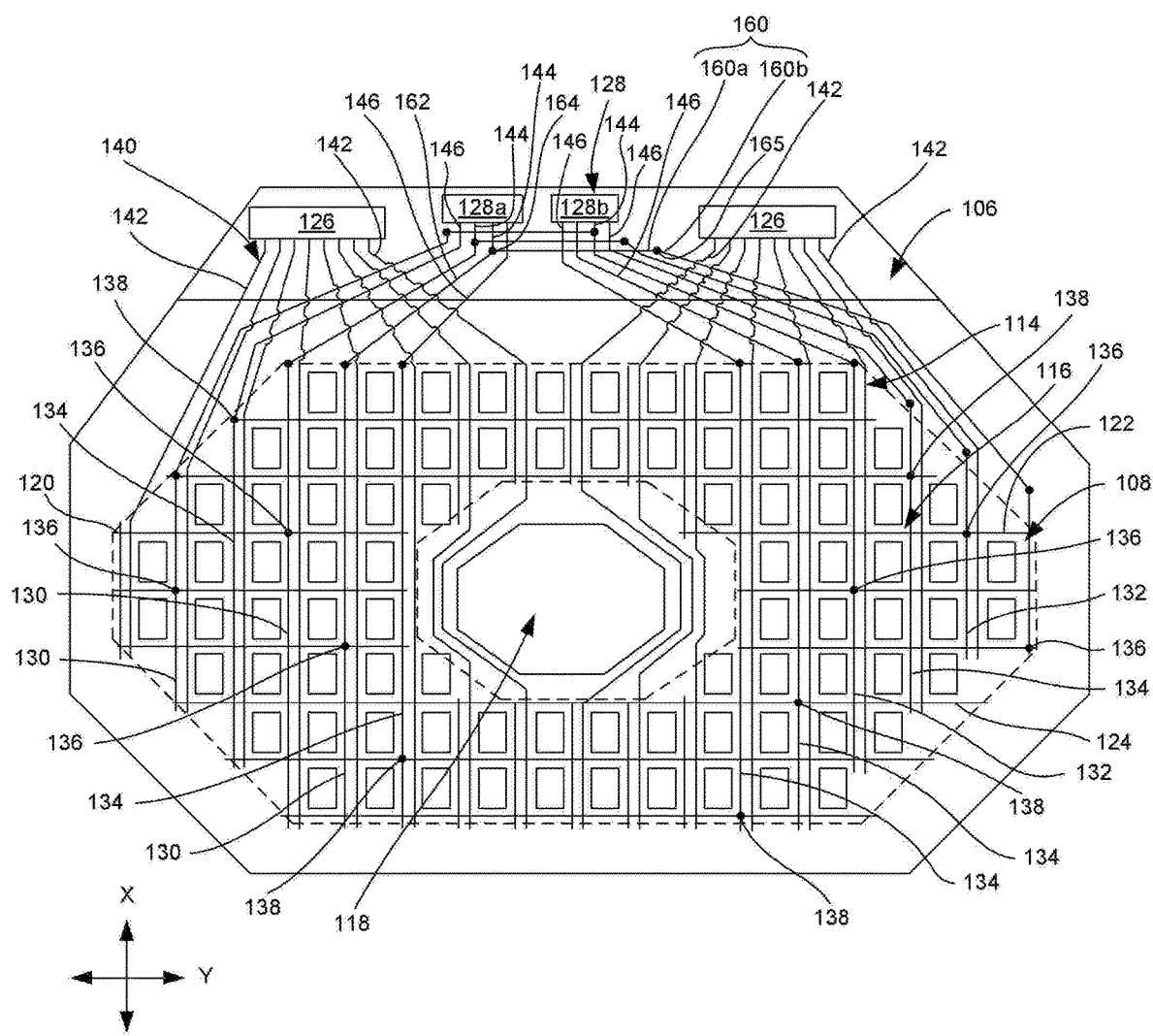
FIG. 9 is a plan view of a display panel of the display device, in accordance with another exemplary embodiment of the present disclosure.

In the exemplary embodiments of the present disclosure, the display region 108 is provided with a void (referred by the numeral 118). By "provided" herein means that the void 118 may be formed by cutting, piercing, molding, etching, or any other known process in a glass substrate (not shown) of the display panel 102. The void 118 may, generally, be in the form of a hole or empty space in which no data lines (from the plurality of data lines 114) and no gate lines (from the plurality of gate lines 116) are arranged. Although in FIG. 2, the void 118 has been shown to be located close to the lower edge 108b of the display region 108, in other examples, the void 118 may be located at other location in the display region 108; for example, as shown in FIGS. 6, 8 and 9 of the accompanying drawings but not limited thereto. Further, in FIG. 2, the void 118 has been shown to have a generally rectangular or square shape; however, it will be clear that the void 118 may have any other shape; for example, as shown in FIGS. 6, 8 and 9 of the accompanying drawings but not limited thereto.

Figure 2:
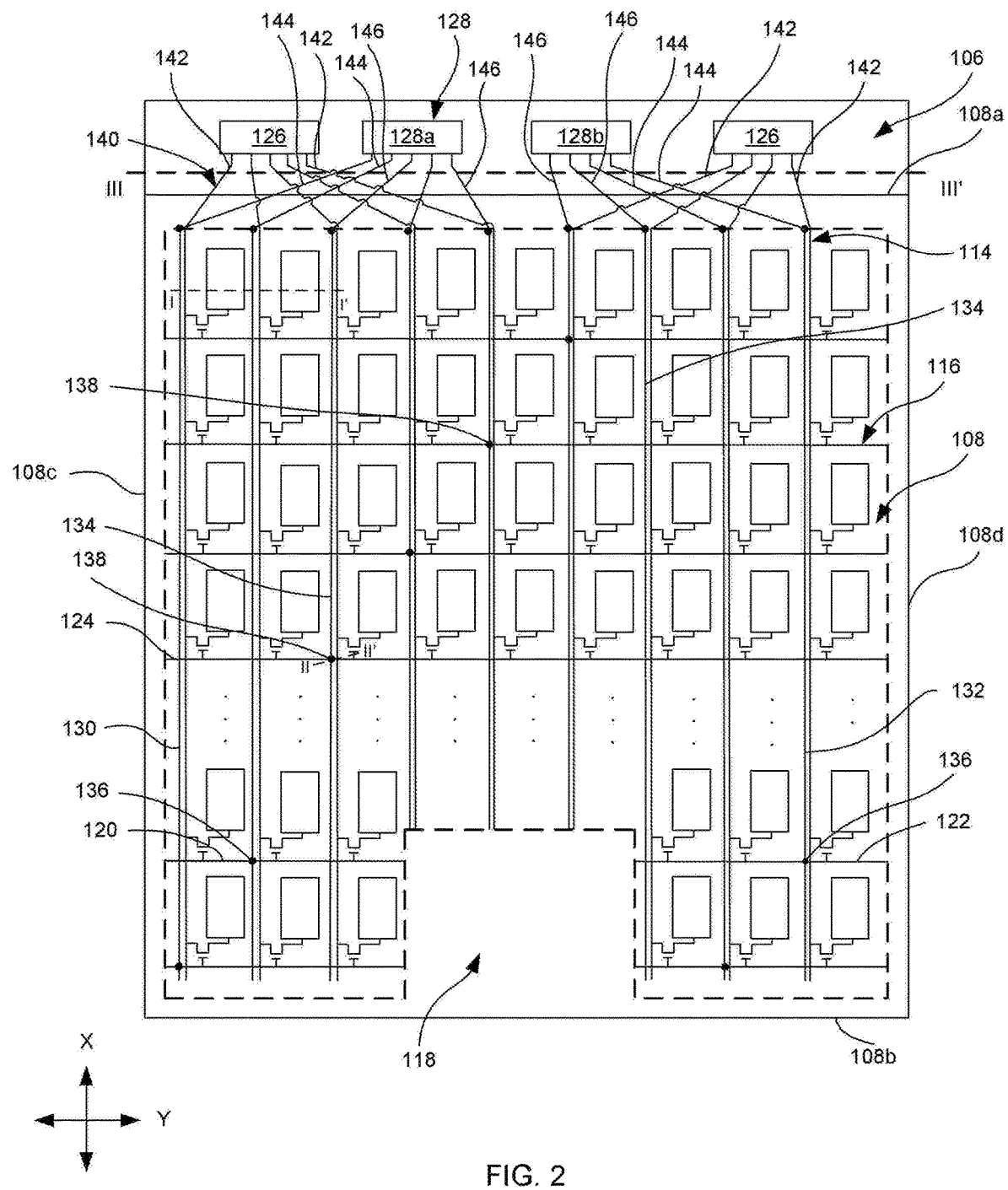
FIG. 2 is a plan view of a display panel of the display device, in accordance with an exemplary embodiment of the present disclosure.

In the present embodiments, the plurality of gate lines 116 include a first gate line 120, a second gate line 122 and a third gate line 124 extending in the second direction 'Y'. Herein, the first gate line 120 and the second gate line 122 are separated from each other and are arranged in a same row of the matrix in the display region 108 of the display panel 102. Specifically, the first gate line 120 and the second gate line 122 are separated at the void 118 in the display region 108. It may be seen that the first gate line 120 and the second gate line 122 may be equidistant from the upper edge 108a as well as the lower edge 108b of the display region 108 in the display panel 102. Further, the third gate line 124 is, generally, a continuous line extending along an entire horizontal length between the left edge 108c and the right edge 108d of the display region 108. Herein, the third gate line 124 is longer than a combination of the first gate line 120 and the second gate line 122. The third gate line 124 may be located, generally, above or below the void 118. In some embodiments, as illustrated in FIG. 2, one or more data lines of the plurality of data lines 114 which may encounter the void 118 while extending along the first direction 'X' may deviate from the first direction 'X' and extend around the void 118, while generally still be extending in the first direction 'X'.

It may be understood that although some of the present embodiments have been described in reference to a single first gate line (such as, the first gate line 120), a single second gate line (such as, the second gate line 122) and a single third gate line (such as, the third gate line 124), the display panel 102 would typically have plurality of such lines 120, 122, 124 therein, and hereinafter any reference to a single line may be applied to multiple corresponding lines without any limitations. Also, it may be contemplated that in a conventional display panel with continuous gate lines, one or more gate lines of the plurality of gate lines could possibly encounter the void (such as, the void 118) while extending along the second direction (such as, the second direction 'Y'), while other gate lines may not do so. It may be appreciated that in the present embodiments, the first gate line 120 and the second gate line 122 which are separated at the void 118 may generally correspond to such one or more gate lines of the plurality of gate lines encountering the void, while the third gate lines 124 in the display device 100 may correspond to the said other gate lines.

In the illustrated embodiments, the driving circuit 104 is shown to be located above the upper edge 108a of the display region 108, in the non-display region 106 of the display panel 102 in plan view. The driving circuit 104 includes one or more data drivers 126 for providing signals to the plurality of data lines 114 and one or more gate drivers 128 for providing signals to the plurality of gate lines 116. In order for the first gate line 120, the second gate line 122 and the third gate line 124 to be connected to the driving circuit 104, the display device 100 of the present disclosure includes a first gate connector line 130 and a second gate connector line 132, respectively, electrically connecting the first gate line 120 and the second gate line 122 to one or two of the gate drivers 128, and a third gate connector line 134 electrically connecting the third gate line 124 to the gate drivers 128 in the driving circuit 104. In the present embodiments, the first gate connector line 130, the second gate connector line 132 and the third gate connector line 134 extend in the first direction 'X', adjacent and parallel to the plurality of data lines 114 in the display region 108. In one or more examples, the first gate connector line 130, the second gate connector line 132 and the third gate connector line 134 are formed of the same material as used for forming the plurality of gate lines 116. It may be understood that the driving circuit 104 can be located below the bottom edge 108b of the display region 108, in the non-display region 106 of the display panel 102 in plan view without affecting the scope of the present disclosure.

As illustrated, each of the first gate line 120 and the second gate line 122 comprises at least one contact point, such as contact point 136 formed therein. The first gate connector line 130 and the second gate connector line 132 are, respectively, connected to the first gate line 120 and the second gate line 122 at the corresponding contact point 136 therein. In one or more examples, with the display panel 108 having multiple first gate lines (like, the first gate line 120) and multiple second gate lines (like, the second gate line 122), the corresponding first gate connector lines 130 and the corresponding second gate connector lines 132 are arranged such that the contact points 136 may, generally, be disposed along one or more sloping lines (as may be seen from FIG. 2). Further, the third gate line 124 includes at least one contact point, such as contact point 138 formed therein, and the third gate connector line 134 is connected to the third gate line 124 at the corresponding contact point 138 therein. In one or more examples, with the display panel 108 having multiple third gate lines (like, the third gate line 124), the corresponding third gate connector lines 134 are arranged such that the contact points 138 may, generally, be disposed along one or more sloping lines. In some examples, one or more of the third gate line 124 may have two contact points 138 formed therein, corresponding to two number of gate lines, namely the first gate line 120 and the second gate line 122, located below thereof in the display region 108 of the display panel 102 in plan view.

It may be appreciated that the plurality of data lines 114 and each of the first gate line 120, the second gate line 122 and the third gate line 124 may terminate at or close to the upper edge 108a of the display region 108, while the driving circuit 104 is arranged in the non-display region 106 at a distance from the upper edge 108a. In the present embodiments, the display device 100 includes lead lines (generally referred by the numeral 140) which extend from the driving circuit 104, in the non-display region 106, to the upper edge 108a of the display region 108 or beyond thereof. In particular, the lead lines 140 include a plurality of data lead lines 142 electrically connecting the plurality of data lines 114 to the one or more data drivers 126. Further, the lead lines 140 include a plurality of first gate lead lines 144 electrically connecting the first gate connector line 130 and the second gate connector line 132 to the one or more gate drivers 128, and one or more second gate lead lines 146 electrically connecting the third gate connector line 134 to the one or more gate drivers 128. In one or more examples, the data lead lines 142 are formed of the same material as used for forming the plurality of data lines 114. Further, in one or more examples, the first gate lead lines 144 and the second gate lead lines 146 are formed of the same material as used for forming the plurality of gate lines 116. It may be contemplated by a person skilled in the art that during operation of the display device 100, at least in some examples, the first gate line 120 and the second gate line 122 are provided with signals, generally, at a same instant of time so as to complete one horizontal scan for corresponding row of the matrix in the display region 108. Further, it may be appreciated a number of the first gate lead lines 144 is equal to a number of the first gate lines 120 (which, in turn, is generally equal to a number of the second gate lines 122), and a number of the second gate lead lines 146 is equal to a number of the third gate lines 124.

Figure 3:
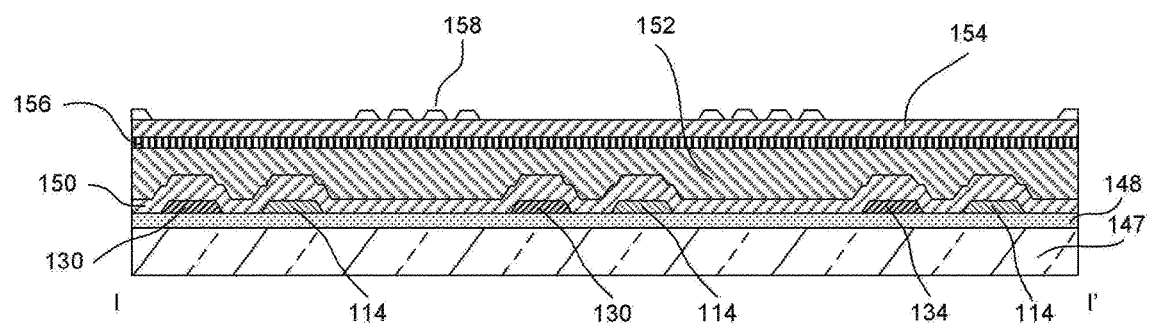
FIG. 3 is a diagrammatic cross-sectional view of a TFT substrate of the display panel taken along a line I-I' of FIG. 2.
Figure 4:
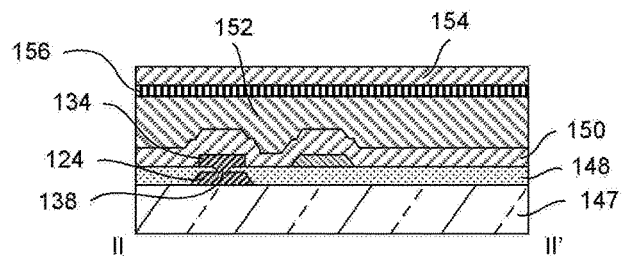
FIG. 4 is a diagrammatic cross-sectional view of a TFT substrate of the display panel taken along a line II-II' of FIG. 2.
Figure 5:
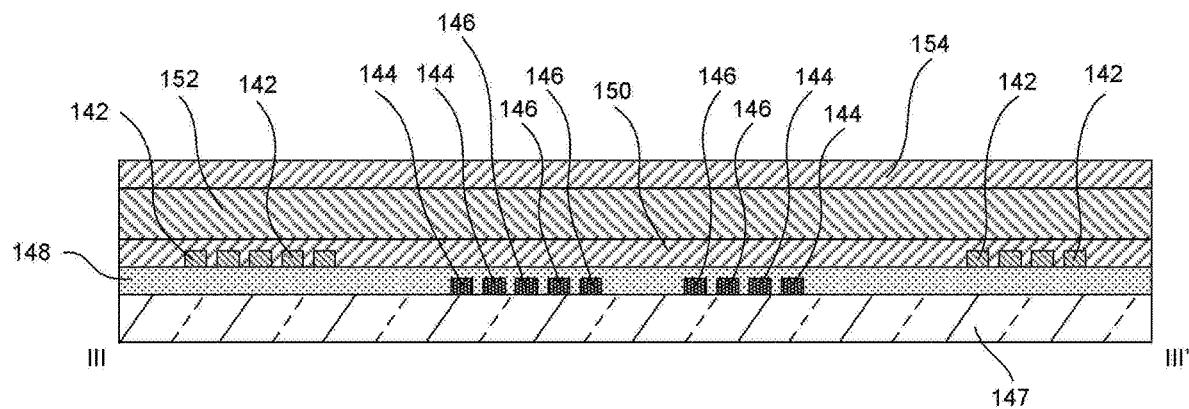
FIG. 5 is a diagrammatic cross-sectional view of the display panel taken along a line III-III' of FIG. 2.

FIGS. 3 and 4 illustrate cross-section views of a TFT substrate of the display panel 102 taken along lines I-I' and II-II' respectively of FIG. 2, and FIG. 5 illustrates cross-section view of the display panel 102 taken along line III-III' of FIG. 2, according to one or more exemplary embodiments of the present disclosure. As illustrated, the display panel 102 includes a glass substrate 147 which may be a sheet of transparent glass material or the like. An insulating layer 148 is disposed on the glass substrate 147. Further, a passivation layer 150 is disposed on the insulating layer 148, an organic insulating layer 152 is disposed on the passivation layer 150, and an another passivation layer 154 is disposed on the organic insulating layer 152. Such configuration and arrangement of layers in a display panel of a liquid crystal display device is well known in the art and thus has not been described herein. It may be appreciated that the display panel 102 may include more or less number of said layers, or different types of said layers, without departing from the scope of the present disclosure.

As illustrated in FIG. 3, the cross-section area along the line I-I' has the data lines 114 and the gate connector lines (including the first gate connector line 130 and the third gate connector line 134) formed next thereto. It may be understood that although only the first gate connector line 130 and the third gate connector line 134 are visible in FIG. 3, the second gate connector line 132 may also have similar arrangement with respect to its corresponding data line 114. As further seen from FIG. 2, the data lines 114 and the gate connector lines (such as, the first gate connector line 130, as shown) are disposed parallel to each other along the first direction 'X' in the display panel 102. As shown in FIG. 3, the data lines 114 and the gate connector lines (such as, the gate connector lines 130 and 134) are arranged between the insulating layer 148 and the passivation layer 150 of the display panel 102. Also, the cross-section area along the line I-I' has a common electrode 156 formed on top of the organic insulating layer 152 and in contact with the another passivation layer 154. Further, pixel electrodes 158 and an alignment layer (not shown) are formed on top of the another passivation layer 154 in the cross-section area along the line I-I' of the display panel 102. As illustrated in FIG. 4, the cross-section area along the line II-II' has one of the gate connector lines (herein, the third gate connector line 134) disposed in contact with one of the plurality of gate lines 116 (herein, the third gate line 124). As shown, the third gate connector line 134 may be formed directly above the third gate line 124 to provide the electrical connection therebetween via a through hole formed in the insulating layer 148. Further, as illustrated in FIG. 5, the cross-section area along the line III-III' (in the non-display region 106) has the lead lines (including the data lead lines 142, and the first gate lead lines 144 and the second gate lead lines 146). As shown, the data lead lines 142 are arranged between the insulating layer 148 and the passivation layer 150 (similar to the corresponding plurality of data lines 114), and the gate lead lines 144 and 146 are arranged between the glass substrate 147 and the insulating layer 148 (similar to the corresponding plurality of gate lines 116). It may be understood that the left-to-right arrangement of various elements discussed above is exemplary only and shall not be construed as limiting to the present disclosure.

Referring back to illustrated embodiment of FIG. 2, the driving circuit 104 includes two gate drivers, namely a first gate driver 128a and a second gate driver 128b such that the first gate connector line 130 is connected to the first gate driver 128a and the second gate connector line 132 is connected to the second gate driver 128b, and thereby the first gate connector line 130 electrically connects the first gate line 120 to the first gate driver 128a and the second gate connector line 132 electrically connects the second gate line 122 to the second gate driver 128b. In one or more examples, the first gate driver 128a and the second gate driver 128b may be in sync with each other so as to provide generally simultaneous gate signals to the first gate line 120 and the second gate line 122. It may be seen that in the embodiment of FIG. 2, the first gate lead lines 144 are not interfering with the second gate lead lines 146. In an alternative example, the two gate drivers 128a and 128b may be replaced by a single driver with same number of terminals as combined number of terminals in the two gate drivers 128a and 128b without affecting the scope of the present embodiment.

Referring now to FIG. 6, a plan view of the display panel 102 is illustrated according to another exemplary embodiment of the present disclosure. Herein, the driving circuit 104 includes a single gate driver 128c configured to send gate pulses to the first gate line 120 and the second gate line 122 simultaneously. In such embodiments, each of the one or more first gate lead lines 144 branches into a first gate lead branch line 160 and a second gate lead branch line 162 such that the first gate lead branch line 160 is connected to the first gate connector line 130 and the second gate lead branch line 162 is connected to the second gate connector line 132. It may be understood that the first gate lead branch line 160 and the second gate lead branch line 162 may carry the same gate signal simultaneously generated from the gate driver 128c for the first gate line 120 (via the first gate connector line 130) and the second gate line 122 (via the second gate connector line 132).

As may be seen from FIG. 6, one or more of the first gate lead lines 144, or in particular the first gate lead branch lines 160 of the first gate lead lines 144 may overlap with the second gate lead lines 146 in plan view of the non-display region 106. Specifically, a portion of the first gate lead branch line 160 may overlap with the second gate lead lines 146, while rest portion of the first gate lead branch line 160 may not overlap with the second gate lead lines 146 (but may overlap with the data lead lines 142). In an embodiment, each of the first gate lead branch line 160 includes a first portion 160a and a second portion 160b with the first portion 160a overlapping, at least partially, the one or more second gate lead lines 146 in plan view, and the first portion 160a being arranged in a same layer as the plurality of data lines 114 and the second portion 160b being arranged in a same layer as the plurality of gate lines 116. Further, the second gate lead branch line 162 is arranged in a same layer as the plurality of gate lines 116, similar to the second portion 160b of the first gate lead branch line 160.

Figure 7:
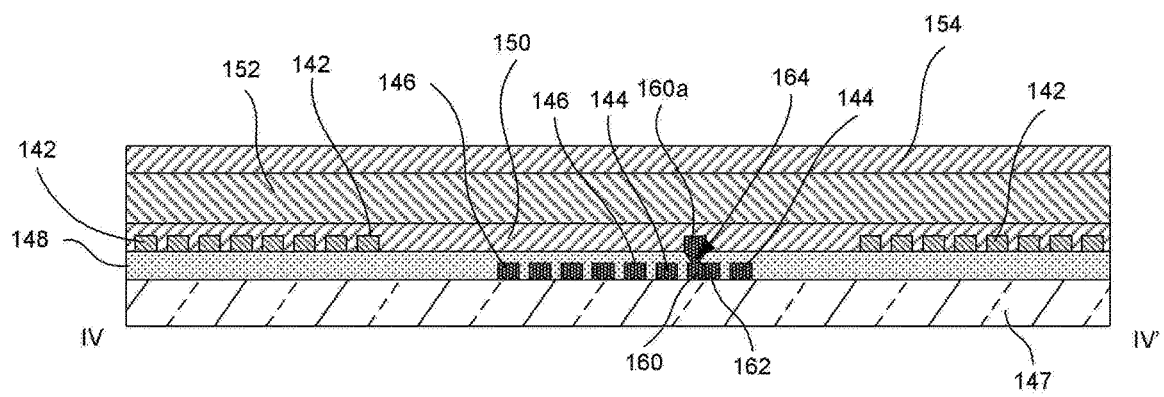
FIG. 7 is a diagrammatic cross-sectional view of the display panel taken along a line IV-IV' of FIG. 6.

FIG. 7 illustrates a cross-section view of the display panel 102 taken along line IV-IV' of FIG. 6, according to one or more exemplary embodiments of the present disclosure. Generally, the cross-section of the display panel 102, as shown in FIG. 7, has the same layers as in the cross-sections of the display panel 102 as shown in FIGS. 3-5. In FIG. 6, the line IV-IV' is shown to pass through the non-display region 106 along a section where only one of the first gate lead line 144 has branched into the corresponding first gate lead branch line 160 and the second gate lead branch line 162, for the sake of simplicity. As shown in FIG. 7, the data lead lines 142 are arranged between the insulating layer 148 and the passivation layer 150 of the display panel 102 of FIG. 6, similar to the data lead lines 142 of the display panel 102 of FIG. 2. Further, as shown, the first gate lead lines 144 and the second gate lead lines 146 are, generally, disposed between the insulating layer 148 and the passivation layer 150; however, it is to be noted that for one of the first gate lead line 144 that has branched into the corresponding first gate lead branch line 160 and the second gate lead branch line 162 along the line IV-IV', the first portion 160a of that first gate lead branch line 160 and the second lead branch line 162 are electrically connected to each other via a through hole 164 formed in the insulating layer 148.

It may be seen from FIGS. 6-7 in combination and contemplated that the first portion 160a of the first gate lead branch line 160 electrically connects with the insulating layer 148 so as to avoid contact with the second gate lead lines 146 already present in a path thereof. It may be understood that an area in which the first portion 160a of the first gate lead branch line 160 may be formed on the insulating layer 148 may not have any data lead lines (such as, the data lead lines 142) formed thereon. Once the region where the first gate lead branch lines 160 are susceptible to intersect with the second gate lead lines 146 is traversed, the second portion 160b of is formed in the same layer as gate lead lines 144, 146. The second portion 160b of the first gate lead branch line 160 connects with the first portion 160a of the first gate lead branch line 160 via an another through hole 165 (similar to the through hole 164). This way the first gate lead branch line 160 mitigate the risk of possible short-circuiting with the second gate lead lines 146 in the display panel 102.

FIGS. 8-9 illustrate plan views of the display panel 102 according to other exemplary embodiments of the present disclosure. It may be seen that the display panel 102 of FIG. 8, generally, corresponds to the display panel 102 of FIG. 2, with the primary difference being in the shape of the void 118. It may be understood that the embodiments of the display panel 102 as described with reference to FIG. 2 may generally be applied to the display panel 102 of FIG. 8, and thus have not been described herein again for the brevity of the present disclosure. Further, it may be seen that the display panel 102 of FIG. 9, generally, corresponds to the display panel 102 of FIG. 6, with the primary difference being in the shape of the void 118. It may be understood that the embodiments of the display panel 102 as described with reference to FIG. 6 may generally be applied to the display panel 102 of FIG. 9, and thus have not been described herein again for the brevity of the present disclosure.

Although the present disclosure has been described in reference to the gate lines (such as, the first gate lines 120 and the second gate lines 122) being separated around the void (such as, the void 118); in other embodiments (not shown), the data lines encountering the void may be separated in addition to the gate lines, or independently of the gate lines (i.e. whether the gate lines are separated or not). In such case, the data drivers (such as, the data drivers 126) may be arranged on either one of the left edge 108c and the right edge 108d of the display panel 102, and data connector lines (akin to gate connector lines 130 and 132) may be formed extending in the second direction 'Y' to connect the separated data lines to the data drivers. Such configurations may be contemplated by a person skilled in the art and thus have not been described herein for the brevity of the present disclosure.

The display device 100 of the present disclosure provides a configuration to arrange the gate lines (and/or the data lines) for a display panel with a void without the need of detouring the gate lines (and/or the data lines) which is generally very difficult and expensive to achieve. In addition, the display device 100 provides an added advantage of arranging the driving circuit 104 with all the drivers (including the gate drivers and the data drivers) therein along one of the edges (such as, the upper edge 108a) of the display panel 102, thus providing an opportunity to eliminate the frame needed to cover any drivers, like gate drivers, that may otherwise have been located along the left edge 108c and/or the right edge 108d. This results in reduced overall bezels of the display device 100 which is desirable.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:
1. A display device comprising:
    a plurality of data lines extending in a first direction;
    a plurality of gate lines comprising a first gate line, a second gate line and a third gate line extending in a second direction different than the first direction to form a matrix with the plurality of data lines, wherein the first gate line and the second gate line are separated from each other and are arranged in a same row of the matrix;

a first gate connector line and a second gate connector line, respectively, electrically connecting the first gate line and the second gate line to one or two gate drivers, wherein the first gate connector line and the second gate connector line extend in the first direction; and wherein the third gate line is longer than a combination of the first gate line and the second gate line;

wherein the plurality of data lines extend in a display region of the display device, and wherein a plurality of data lead lines electrically connect the plurality of data lines to one or more data drivers arranged in a non-display region of the display device;

wherein the plurality of gate lines and each of the first gate connector line and the second gate connector line extend in the display region, and wherein each of the first gate connector line and the second gate connector line are electrically connected to the one or two gate drivers arranged in the non-display region, via one or more first gate lead lines;

the display device further comprising a third gate connector line extending in the first direction and electrically connecting the third gate line to the one or more gate drivers arranged in the non-display region, via one or more second gate lead lines; and wherein each of the one or more first gate lead lines branches into a first gate lead branch line and a second gate lead branch line, and wherein the first gate lead branch line is connected to the first gate connector line and the second gate lead branch line is connected to the second gate connector line.

2. The display device according to claim 1, wherein the first gate lead branch line comprises a first portion and a second portion, and wherein the first portion overlaps, at least partially, the one or more second gate lead lines in plan view.

3. The display device according to claim 2, wherein the first portion is arranged in a same layer as the plurality of data lines.

4. The display device according to claim 2, wherein the second portion is arranged in a same layer as the plurality of gate lines.

5. The display device according to claim 1, wherein the second gate lead branch line is arranged in a same layer as the plurality of gate lines.

6. The display device according to claim 1, wherein the first gate line and the second gate line are separated at a void in a display region of the display device.

7. The display device according to claim 6, wherein the void is a region equivalent to a plurality of pixels in the display region.

8. The display device according to claim 1, wherein the first direction and the second direction are orthogonal to each other.

9. The display device according to claim 1, wherein the one or two gate drivers comprise a first gate driver and a second gate driver, wherein the first gate connector line connects the first gate line to the first gate driver and the second gate connector line connects the second gate line to the second gate driver.

10. The display device according to claim 1, wherein the one or two gate drivers comprise a single gate driver configured to send pulses to the first gate line and the second gate line simultaneously.

11. The display device according to claim 1, wherein each of the first gate line and the second gate line comprises at least one contact point formed therein, and wherein the first gate connector line and the second gate connector line are, respectively, connected to the first gate line and the second gate line at the corresponding at least one contact point.

12. The display device according to claim 1, wherein the third gate line extends along an entirety of the display region.

13. A display device comprising:
a plurality of data lines extending in a first direction;
a plurality of gate lines comprising a first gate line, a second gate line and a third gate line extending in a second direction different than the first direction to form a matrix with the plurality of data lines, wherein the first gate line and the second gate line are separated from each other and are arranged in a same row of the matrix;
a first gate connector line and a second gate connector line, respectively, electrically connecting the first gate line and the second gate line to one or two gate drivers, wherein the first gate connector line and the second gate connector line extend in the first direction;
wherein the first gate line and the second gate line are separated at a void in a display region of the display device; and
wherein the void is a region equivalent to a plurality of pixels in the display region;
wherein the plurality of data lines extend in a display region of the display device, and wherein a plurality of data lead lines electrically connect the plurality of data lines to one or more data drivers arranged in a non-display region of the display device;
wherein the plurality of gate lines and each of the first gate connector line and the second gate connector line extend in the display region, and wherein each of the first gate connector line and the second gate connector line are electrically connected to the one or two gate drivers arranged in the non-display region, via one or more first gate lead lines;
the display device further comprising a third gate connector line extending in the first direction and electrically connecting the third gate line to the one or more gate drivers arranged in the non-display region, via one or more second gate lead lines; and
wherein each of the one or more first gate lead lines branches into a first gate lead branch line and a second gate lead branch line, and wherein the first gate lead branch line is connected to the first gate connector line and the second gate lead branch line is connected to the second gate connector line.

\* \* \* \* \*